(No Model.)
C. COPLANTZ.
HORSESHOE.
No. 467,497. Patented Jan. 26, 1892.
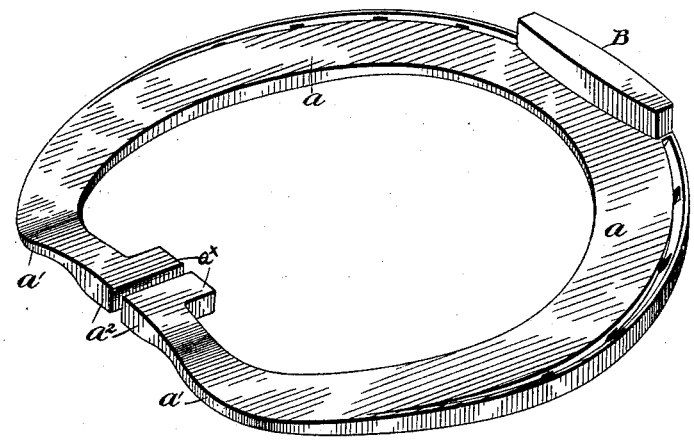
Witnesses
Inventor
Cyrus Coplantz
By James E. Young
Brown & Seward
Attorneys

UNITED STATES PATENT OFFICE.

CYRUS COPLANTZ, OF KANSAS CITY, MISSOURI.

HORSESHOE.

SPECIFICATION forming part of Letters Patent No. 467,497, dated January 26, 1892.

Application filed July 31, 1890. Serial No. 360,582. (No model.)

*To all whom it may concern:*

Be it known that I, CYRUS COPLANTZ, a citizen of the United States, residing at Kansas City, in the county of Jackson and State of Missouri, have invented certain new and useful Improvements in Horseshoes; and I do hereby declare the following to be a full, clear, and exact description of the invention, such as will enable others skilled in the art to which it appertains to make and use the same.

My invention relates to horseshoes, and the object is to produce a shoe which shall conform to the natural shape of the animal's hoof and which shall assist the natural action of the frog, while at the same time protect the frog from injury by contact with hard-paved roadways.

A further object of my invention is to produce a horseshoe which shall not interfere with the natural expansion and contraction of the hoof during the movements of the animal.

To the above purposes my invention consists in certain peculiar and novel features of construction and arrangement, as hereinafter described and claimed.

In order that my invention may be fully understood, I will proceed to describe it with reference to the accompanying drawing, in which the figure is a perspective view of a horseshoe embodying my invention, the shoe being in inverted position.

It has been found as the result of careful observation that as a horse travels either at a walk or at a faster pace there is, when the animal is unshod, an alternate expansion (or spreading) and contraction of the hoof, the expansion or spreading occurring when the animal places its hoof upon the ground and brings the weight of its body thereon, and the contraction occurring when the foot is lifted from the ground. It is also found that these expanding and contracting movements are greatest at the quarter or hinder part of the hoof and gradually diminish toward the toe. It has also been found that in unshod horses the frog, being an elastic body and coming directly into contact with the ground, acts as a cushion to lessen the jar and impact of rapid movement, and also assists in recovery as the hoof is lifted off of the ground.

Horseshoes as heretofore constructed have almost entirely prevented the described expansion and contraction of the hoof and have also rendered the frog practically useless, and hence the animal's hoof has been transformed by the shoe into a rigid structure, which becomes rapidly injured by use, and which speedily produces lameness and other diseases, which soon entirely disable the animal. Heretofore attempts have been made to remedy some of these defects. For instance, horseshoes have heretofore been beveled outwardly and downwardly on their upper sides for the purpose of permitting the hoof to expand; but while such shoes have permitted expansion they have entirely prevented contraction of the hoof when the shoe was solidly attached to the hoof, and consequently such shoes caused a speedy separation of the horny exterior of the hoof from the sensitive interior or sole, and consequently the animal has been so lamed as to become unfit for work. If the shoe were beveled inwardly and downwardly the reverse defect would simply result—that is to say, the hoof might contract somewhat, but could not possibly expand, and lameness would quickly ensue. Again, it has been found that the frog, being very elastic and sensitive, is subjected to great injury by contact with paved streets and roadways, and it has been attempted to avoid this injury by turning the heels of the shoe inward, so as to extend beneath the quarter and frog, and thus protect these parts from direct contact with the pavement or roadway. This construction has been defective because the frog is as much injured by contact with the heels of the shoe as it would be by contact with the ground or pavement, and this injury is due to the fact that the inturned portions of the heels have been made rigid, thus preventing all elastic action of the frog, as well as all expansive and contractive action of the hoof. By reference to the ensuing description, it will be seen that I have produced a shoe which overcomes all of these defects.

Referring now to the said drawings, *a* designates the shoe, which is mainly of such form as to correspond with the shape of the bottom of the hoof and the upper surface of which is perfectly flat throughout without any inclination either inwardly or outwardly.

A suitable calk B is preferably formed on the under side of the toe of the shoe, and the shoe is tapered in thickness from the toe to the heel, as shown. The heels of the shoe are bent inward toward each other from the points $a'$ to the points $a^2$, so that their inner ends are closely adjacent to but slightly separated from each other, as shown, and the inner extremities of these heels are preferably enlarged to extend forwardly, as at $a^\times$, so as to form or to receive suitable heel-calks. The entire shoe is preferably made of spring-steel of a temper sufficiently strong and at the same time elastic for the purposes to which the shoe is applied. In any event it is to be observed that the inwardly turned or convergent heel portions of the shoe are tempered, so as to be sufficiently elastic to yield and recover their normal position as the hoof is planted upon and raised from the ground. It is also to be observed that these convergent heel portions not only extend inwardly, but are bent downwardly toward each other, as shown. This inward and downward inclination of the spring-heels is of material importance, as will presently be seen.

When the shoe as above constructed is properly nailed to the hoof, the downturned heel portions diverge from but underlie the frog and quarter, and hence when the animal places its hoof upon the ground the quarter and frog do not come into contact with the ground and are protected from injury. At the same time the animal's weight causes the spring-heels to yield somewhat, and this permits the hoof as well as the shoe to expand from rear to front in a perfectly natural manner, although the frog and quarter do not come into violent contact with the heels of the shoe. As soon as the hoof is raised from the ground the shoe contracts naturally with the hoof, and the spring-heel portions of the shoe assist the recovering action of the frog. It is to be particularly observed that as the forwardly-extending projections $a^\times$ immediately underlie the frog of the animal's hoof they protect the frog from injury by violent contact with the pavement or roadway, but that inasmuch as the inwardly-extending heel portions also extend downwardly the frog never comes into contact with the forwardly-extending portions, and consequently there is no possibility of injury of the frog by contact with the heel portions. It will thus be seen that I have produced a shoe which fully protects the hoof from injury by violent contact with the roadway or pavement and which at the same time permits a natural unrestrained action of the hoof, these results being attained by the resilience of the body portion of the shoe and the downward and inward direction of the heel portions together with the resilience of said heel portions. It is to be understood that the heel portions thus constructed and arranged constitute practically an artificial frog, permitting the quarter to expand and contract, as the natural frog does, assisting in the recovery of the hoof after each stride, as the natural frog also does, and at the same time preventing any contact of the frog either with the roadway or with the heel-pieces themselves, and consequently preventing all possibility of concussion of the frog and consequent lameness.

Having thus described my invention, what I claim as new therein, and desire to secure by Letters Patent, is—

As a new article of manufacture, a horseshoe consisting of a resilient body portion $a$, having a flat upper surface and constructed with heel portions $a'$ $a^2$, formed on their inner ends with forwardly-extending portions $a^\times$, the said heel portions $a'$ $a^2$ being also resilient and being closely adjacent to but separate from each other at their inner ends, and also extending inward and downward, so as to entirely clear the frog of the hoof, substantially as set forth.

In testimony whereof I have affixed my signature in presence of two witnesses.

CYRUS COPLANTZ.

Witnesses:
 BESSIE E. YOUNG,
 DAISY B. SMALLEY.